Jan. 28, 1936.　　　H. N. ATWOOD　　　2,029,214
HONEYCOMB WING CONSTRUCTION FOR AIRPLANES
Filed Sept. 14, 1934
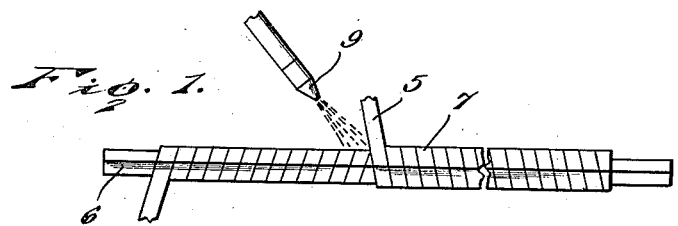
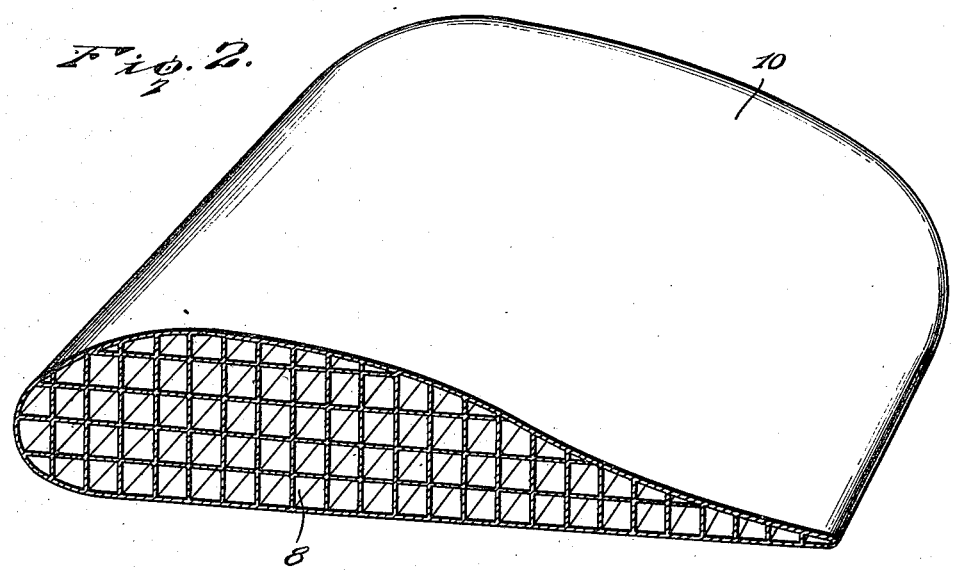
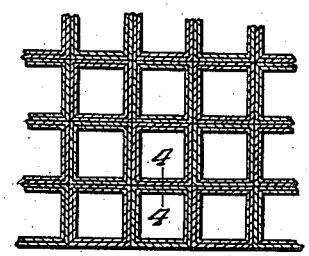
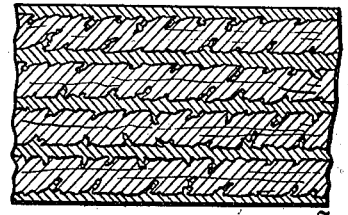
Inventor
Harry N. Atwood.
By Lacy & Lacy, Attorneys Patented Jan. 28, 1936

2,029,214

UNITED STATES PATENT OFFICE 2,029,214

HONEYCOMB WING CONSTRUCTION FOR AIRPLANES

Harry N. Atwood, South Lyndeboro, N. H.

Application September 14, 1934, Serial No. 744,070

2 Claims. (Cl. 244—31)

This invention relates to airplanes, and more particularly to the construction of the wings thereof.

The object of the invention is to provide a sustaining wing for airplanes which is light in weight and strong and durable in construction and which will effectually withstand all strains and stresses to which it may be subjected during flight or incident to making a take-off or effecting a landing.

A further object of the invention is to provide an airplane of cellular or honeycomb construction which not only materially reinforces and strengthens the wing but also renders it buoyant and prevents sinking in case of accident when flying over a body of water.

A further object is to provide an airplane wing, the construction of which is such that should a structural defect occur in any particular tube or cell, or should one or more of said tubes or cells become damaged from fire or otherwise, said damaged or defective tube or tubes will have no material effect on the sustaining or lifting properties of the rest of the wing structure owing to the honeycomb construction thereof and the bonding action between the tubes constituting said wing.

A further object is to provide an airplane wing including in its structure a plurality of tubular members formed of wood veneer strips impregnated with an acetone solution containing cellulosic plastic material, said tubular members being arranged side by side in intimate bonding contact with each other and conforming to the general outline or surface delineation of the wing, the exterior of the wing being coated with cellulosic plastic material to form a case-hardened protective jacket or finish.

A still further object of the invention is generally to improve and simplify the construction of airplane wings so as to increase their utility, durability and efficiency and particularly to eliminate extraneous fastening devices, such as bolts, stays, wires, turnbuckles, spars, braces, struts and analogous members necessary in present-day wing construction to carry and transmit concentrated loads.

In the accompanying drawing forming a part of this specification and in which similar numerals of reference indicate corresponding parts in all the figures of the drawing:

Figure 1 is a side elevation showing the manner of coiling the wood veneer strips on a mandrel to form the tubular members or cells constituting the body of the sustaining wing.

Figure 2 is a transverse sectional view, partly in perspective, of a complete airplane wing showing the manner of assembling the tubular members and bonding them together to form a reinforced cellular or honeycomb structure.

Figure 3 is a detail vertical sectional view showing the manner of assembling the tubes.

Figure 4 is an enlarged detail sectional view showing how the tubes and wood and veneer plies thereof are bonded together.

In fabricating an airplane wing according to the present invention, I take thin strips 5 of natural wood veneer, preferably birch, and of any desired length, width and thickness, although it is preferred that the thickness of the strip or strips be one-forty-eighth of an inch and the width thereof approximately one inch. The strip or strips 5 of wood veneer should be dry, or reasonably dry, and immersed in an acetone solution containing approximately five percent by weight of solid cellulosic plastic material such as celluloce acetate, cellulose nitrate or cellulose ester and allowed to remain immersed until the wood veneer is impregnated therewith and covered on both sides with said solution. The veneer strip or strips are then removed from the solution and allowed to dry so as to cause the plastic material on the surface of the strip to become normally hard and tough. The impregnated strips are then wound or coiled around a shaping mandrel 6 which may be of any desired cross sectional formation but is preferably rectangular in shape to form a correspondingly shaped tube, as shown. These wood veneer strips are preferably wound in reversely disposed spiral superposed layers 7 with the adjacent edges of the veneer strips of the foundation layer abutting and with the next succeeding layer overlapping the foundation layer and in intimate bonding contact therewith so as to form a tubular member 8. During the coiling or winding operation, the wood veneer laminations are preferably sprayed or otherwise covered with said acetone solution, as indicated at 9, so as to thoroughly cover the wood veneer and cause close adhesion between the parts. The tubes are then placed on finishing mandrels and while the exterior of the tubes are still moist or wet with the acetone solution, said tubes are assembled and pressed together so as to cause their adhesive surfaces to intimately unite and become securely bonded together. Certain of the tubular members 8 are of a size and shape to conform to the curvature of the surfaces of the wing, otherwise they are similar in construction to the remaining tubes. After the tubes have been assembled in the manner described, if desired, the entire exterior surface of the built-up structure may be coated or otherwise treated with an acetone solution so as to form a case-hardened protective jacket or finish 10. The tubes while in position on the finishing mandrels and either before or after the finish 10 is applied, are placed between suitable pressing elements and the wing structure thus formed subjected to heat and pressure which further forces the cellulosic plastic material into the fibers and interstices of the wood and conjunctively causes a secure bonding action between the cells constituting the honeycomb structure so as to produce a strong reinforced wing capable of effectually withstanding all strains and stresses to which it may be subjected during flight or incident to making a take-off or effecting a landing. The tubes 8 are preferably covered on the interior, as well as the exterior, with the acetone solution so that not only is the wood veneer well preserved but this coating also acts as a skin reinforcement and assists in strengthening the wing. By using cellulosic plastic material which has been dissolved in acetate to form an acetone solution, the acetate can be removed by a process of evaporation, leaving the cellulosic plastic material in its original chemical structure. Therefore, the cellulosic plastic material can be specifically applied again and again, layer upon layer upon the cellulosic plastic surfaces of the individual tubular members or the built up structure so as to cover and reinforce said plastic surfaces with a like chemical structure and the parts welded and integrated together into one homogeneous cellulosic plastic structure by the mere application of heat and without liability of charcoaling or carameling the wood veneer or other fibrous material and, consequently, without reducing the inherent strength of said reinforcing material. Moreover, as the cellulosic plastic material can be softened by heat without changing its chemical characteristics, it follows that two or more of the tubular members can be chemically welded and bonded to each other and to adjacent tubular members, as well as to the surface coating of the wing, and when solidified the plastic will form a hard glass-like surface which may be reinforced and strengthened whenever necessary or desired by additional lamina or wood and plastic lamina and heat treatments. Such a construction, therefore, is particularly desirable in the fabrication of sustaining wings, elevators, stabilizers or other parts of airplanes as should any portion of the wing become damaged, the damaged area may be readily repaired by the replacement of new tubular members and additional plastic material and heat treatments.

The cells of the honeycomb structure form air compartments for the wing, thereby rendering the wing exceedingly buoyant so as to prevent sinking in case of accident in flying over a body of water. Furthermore, owing to the cellular or honeycomb formation of the wing, should a defect occur in any particular tube or tubes or should one or more of said tubes or cells become damaged or destroyed from fire or otherwise, said damaged tube or tubes will have no material effect on the sustaining or lifting properties of the rest of the wing, as, owing to the bonding action between the tubes, the remaining portion of the wing will remain intact and therefore obviate the necessity for making a forced landing to effect necessary repairs to the damaged tube or tubes. The cellular construction of the wing while not rendering the wing absolutely fireproof, nevertheless reduces the fire hazard and danger of accident as result thereof to a minimum, inasmuch as should one or more of the tubular members catch on fire, the combustion would be exceedingly slow and at no time could the flames destroy a sufficient portion of the cover surface of the wing to cause the wing to suddenly cease lifting.

Inasmuch as the tubes 8 are disposed in superposed relation with the vertical walls of one tube in vertical alinement with the vertical walls of an adjacent tube, said vertical walls constitute laminated struts which serve to reinforce and brace the upper and lower cover surfaces of the wing and prevent accidental collapse or breakage when subjected to tortional or tensile strains. The horizontal walls act as tension or compression members so that in conjunction with the vertical walls a cantilever construction is provided whereby each and every tube or portion thereof bears a small proportion of the total load and in such a manner that it is not necessary to provide auxiliary and extraneous reinforcing members or struts.

It will thus be seen that there is provided a composite honeycomb wing structure of tough and durable construction which is light in weight and can be fabricated at a minimum cost. It will be understood that a structural element constructed in accordance with the present invention may be used on airplanes, hydro-airplanes, amphibians and all kinds of air and water craft, either as a wing, elevator, stabilizer or other structural part of the craft.

Having thus described the invention, what is claimed as new is:

1. An air foil formed entirely of preformed tubular members arranged in superposed layers, each layer comprising a plurality of individual tubes having bonding contact with each other and with the tubular members of adjacent layers, and a covering for the air foil.

2. A honeycomb wing structure for airplanes formed entirely of preformed tubular members each complete in itself, said tubular members being disposed in vertical and horizontal layers with their walls in flat contacting engagement with each other and intimately connected and bonded together to form vertical and horizontal reinforcing partitions, each partition being of a thickness corresponding to the combined thickness of the contacting walls of adjacent tubular members, and a covering for said wing structure.

HARRY N. ATWOOD.